(12) United States Patent
Frank et al.

(10) Patent No.: US 8,899,135 B2
(45) Date of Patent: Dec. 2, 2014

(54) CUTTING TOOL SETTING SYSTEM

(75) Inventors: Jochen Frank, Sachsenheim (DE);
Ewald Hasselkuss, Fellbach (DE);
Frank Stahl, Pleidelsheim (DE)

(73) Assignee: Komet Group GmbH, Besigheim (DE)

( * ) Notice: Subject to any disclaimer, the term of this patent is extended or adjusted under 35 U.S.C. 154(b) by 285 days.

(21) Appl. No.: 13/264,452

(22) PCT Filed: Mar. 25, 2010

(86) PCT No.: PCT/EP2010/053898
§ 371 (c)(1),
(2), (4) Date: Oct. 14, 2011

(87) PCT Pub. No.: WO2010/118941
PCT Pub. Date: Oct. 21, 2010

(65) Prior Publication Data
US 2012/0034040 A1   Feb. 9, 2012

(30) Foreign Application Priority Data

Apr. 15, 2009 (DE) .......................... 10 2009 017 094

(51) Int. Cl.
*B23Q 15/22* (2006.01)
*B23B 29/034* (2006.01)
*B23Q 1/00* (2006.01)
*B23Q 17/22* (2006.01)
*B25B 13/48* (2006.01)
*B25B 15/02* (2006.01)

(52) U.S. Cl.
CPC ........ *B23B 29/03403* (2013.01); *B23Q 1/0009* (2013.01); *B23Q 17/2225* (2013.01); *B25B 13/48* (2013.01); *B25B 15/02* (2013.01); *B23B 2260/024* (2013.01); *B23B 2260/078* (2013.01); *B23B 2260/088* (2013.01); *B23B 2270/32* (2013.01)
USPC .................... 82/1.2; 408/8; 408/13; 408/147; 81/177.85

(58) Field of Classification Search
CPC ........ B23Q 15/20; B23Q 15/22; B23Q 15/24; B23Q 15/26; B23Q 15/28
USPC ............. 82/1.2, 1.4; 408/5–13, 16; 81/177.85
See application file for complete search history.

(56) References Cited

U.S. PATENT DOCUMENTS 613,596 A * 11/1898 Patzschke ........................ 30/107
1,193,426 A *  8/1916 Rollinson et al. ................ 82/1.2

(Continued)

FOREIGN PATENT DOCUMENTS

CH          637 050         7/1983
DE       38 31 854 A1      4/1989

(Continued)

OTHER PUBLICATIONS

International Search Report dated Aug. 24, 2010 with English translation (11 pages).

(Continued)

*Primary Examiner* — Daniel Howell
*Assistant Examiner* — Ryan Rufo
(74) *Attorney, Agent, or Firm* — Flynn, Thiel, Boutell & Tanis, P.C.

(57) ABSTRACT

A cutting tool setting system contains a tool head for the settable holding of a cutting tool, the head having an adjustment device for the cutting tool. The cutting tool setting system has a setting tool which can be mechanically removably engaged in the tool head at an interface for adjusting the adjustment device in the tool head. The setting tool contains a shaft body having a key part. A key engagement for actuating the adjustment device is designed on the tool head. The key part can be displaced relative to the shaft body in the direction of the longitudinal axis of the body in order to selectively couple and release the key part of the setting tool and the key part at the interface of the tool head.

20 Claims, 3 Drawing Sheets

(56) References Cited

U.S. PATENT DOCUMENTS

| | | | |
|---|---|---|---|
| 2,151,251 A * | 3/1939 | Weidner | 279/6 |
| 3,067,637 A * | 12/1962 | Horning | 82/1.2 |
| 3,710,659 A * | 1/1973 | Pagella et al. | 82/1.2 |
| 4,500,233 A * | 2/1985 | Dehn | 408/182 |
| 4,552,493 A * | 11/1985 | Schultshick | 408/3 |
| 4,617,846 A * | 10/1986 | Horsch | 82/1.2 |
| 4,676,127 A | 6/1987 | Watanabe | |
| 5,000,627 A | 3/1991 | York | |
| 5,003,847 A * | 4/1991 | Wagner | 81/57.39 |
| 5,120,167 A * | 6/1992 | Simpson | 408/158 |
| 5,251,511 A | 10/1993 | Muendlein et al. | |
| 5,655,422 A | 8/1997 | Stolz et al. | |
| 5,807,037 A | 9/1998 | Schneider et al. | |
| 6,280,047 B1 * | 8/2001 | Chen | 362/120 |
| 6,347,564 B1 * | 2/2002 | Ciocca | 81/177.8 |
| 6,490,955 B2 * | 12/2002 | Chang-Kao et al. | 81/177.75 |
| 6,705,183 B1 * | 3/2004 | Dickens | 81/437 |
| 6,901,826 B2 * | 6/2005 | Huang | 81/177.2 |
| 6,928,903 B1 * | 8/2005 | Liao | 81/58.3 |
| 7,018,298 B1 * | 3/2006 | Chiou | 464/159 |
| 7,039,975 B1 * | 5/2006 | Liao | 7/165 |
| 7,267,034 B2 * | 9/2007 | Hsieh | 81/177.2 |
| 7,387,051 B1 * | 6/2008 | Chiang | 81/124.4 |
| 2007/0297866 A1 | 12/2007 | Bassett | |
| 2008/0216610 A1 * | 9/2008 | Hsieh | 81/59.1 |
| 2010/0064860 A1 * | 3/2010 | Kozak et al. | 81/177.6 |

FOREIGN PATENT DOCUMENTS

| | | |
|---|---|---|
| DE | 43 14 295 A1 | 11/1993 |
| DE | 43 30 822 A1 | 3/1995 |
| DE | 100 16 195 A1 | 10/2001 |
| DE | 10 2005 034 426 A1 | 12/2006 |
| DE | 10 2006 037 203 B4 | 2/2008 |
| DE | 10 2009 017 094 A1 | 10/2010 |
| EP | 0 491 724 B1 | 7/1992 |
| EP | 1 758 710 B1 | 3/2007 |
| FR | 2 438 528 | 5/1980 |
| JP | 10-225836 | 8/1998 |
| WO | WO 91/03345 | 3/1991 |
| WO | WO 2006/000746 A1 | 1/2006 |
| WO | WO 2006/136338 A1 | 12/2006 |

OTHER PUBLICATIONS

German Patent Office Search Report dated Feb. 1, 2010, with English translation of p. 2 (5 pages).

* cited by examiner

CUTTING TOOL SETTING SYSTEM

FIELD OF THE INVENTION

The invention relates to a cutting tool setting system comprising a tool head for the settable holding of a cutting tool, which head has an adjustment device for the cutting tool, and comprising a setting tool, which can be made to engage with the tool head in a mechanically detachable manner at an interface for the adjustment of the adjustment device in the tool head, wherein the setting tool has a shank body with a key part and wherein a key engaging means for the actuation of the adjustment device is formed on the tool head.

Cutting tool setting systems are used for setting cutting inserts on cutting tools for metal working. This involves the cutting inserts being exposed to wear. There is the need to set the cutting edges to exact dimensions. The cutting inserts must therefore be readjusted from time to time.

DESCRIPTION OF THE RELATED ART

A cutting tool setting system of the type mentioned at the beginning is known from EP-0 491 74 B1. This cutting tool setting system comprises a tool head which is designed for connection to the machine spindle of a machine tool. The tool head has an adjustable slide, on which a cutting tool receptacle is formed. This slide acts as a cutting tool adjustment device. For adjusting the slide, the tool head contains a hexagon socket screw. This hexagon socket screw is coupled to a toothed gear mechanism, which acts on the slide. The slide can be adjusted at the hexagon socket screw by a hexagon key as a setting tool. For sensing the tool setting, the tool head includes an electrical measuring device. The electrical measuring device is arranged in the adjustable slide in the tool head. The tool head has a connector interface, via which measurement information can be read from the electrical measuring device. For activating the measuring device and for displaying measurement data, on the tool head there is an electrical switching unit with momentary-contact switches and a display.

In EP-1 758 710 B1, a cutting tool setting system with an adjustable cutting tool carrier is described. For the setting of a cutting tool, the cutting tool carrier has a key engaging means. At this key engaging means, the cutting tool carrier can be adjusted by a setting tool, which has a key element. The cutting tool carrier includes an electronic measuring circuit. The electronic measuring circuit serves the purpose of sensing an adjustment of the cutting tool carrier. The setting tool has a display, in order to display a setting of the cutting tool sensed by means of the electronic measuring circuit. For the operation of the measuring circuit, on the cutting tool carrier there are two electrical connection contacts. These connection contacts are designed for electrical contact with corresponding connection contacts on the setting tool. During the adjustment of the cutting tool carrier, in the setting tool the measuring circuit is supplied with electrical power via these contacts. At the same time, these contacts serve the purpose of transmitting measurement signals from the measuring circuit to the display on the setting tool.

In CNC machines, in particular, there is the problem that, as a result of soiling and poor illumination of a tool head or a cutting tool carrier, cutting inserts can often only be accurately set by an operator with great effort. This makes the adjustment of the cutting tools time-consuming and results in correspondingly prolonged machine downtimes.

OBJECT OF THE INVENTION

The object of the invention is to provide a cutting tool setting system with which cutting tools can be exactly set in a short time.

This object is achieved by a cutting tool setting system of the type mentioned at the beginning in which the setting tool has a key part which can be moved in relation to the shank body of the setting tool in the direction of the longitudinal axis of the latter, in order optionally to couple or release the key part of the setting tool and the key engaging means on the interface of the tool head.

This achieves the effect that the setting tool can be placed against the tool head, for example in order to read out measurement information from the electrical measuring device, without the key part of the setting tool and the key engaging means on the tool head having to be mechanically brought into engagement for this purpose.

For sensing the setting of the cutting tool, the tool head includes an electrical measuring device. In order to transmit the measurement information to the outside, the tool head has an electrical connection element, which interacts with an electrical connection element on the setting tool.

The electrical connection element on the tool head and on the shank body of the setting tool may be designed for optical and/or capacitive and/or inductive transmission of measurement information or for the transmission of measurement information by means of radio. The electrical connection element on the tool head and the electrical connection element on the setting tool preferably comprise one or more galvanic contacts.

In a development of the invention, the key part is arranged on a shaft part which is mounted displaceably in the shank body. In this case, a latching device is provided for the shaft part, which device latches the shaft part in a first position for the engagement of the key part in the key engaging means on the interface of the tool head and/or in a second position, in which the key part is retracted into the shank body. In this way, an exact adjustment with the setting tool is made possible.

The setting tool preferably has a shank body which has a tool-head engaging part, in which there is formed a mechanical coupling device which is separate from the electrical connection element and brings about a rotationally fixed coupling of the shank body and the tool head when the setting tool engages in the tool head. In this way, a more secure seating of the setting tool on the tool head for a tool setting is ensured and undesirable wearing of electrical contacts of the arrangement is avoided. In addition, almost play-free engagement of the key part of the setting tool in the key engaging means on the tool head is made possible in this way.

The coupling device on the setting tool is preferably assigned a coupling device on the tool head, wherein the coupling device on the setting tool has at least one coupling lug for which there is an associated receptacle on the tool head. The coupling lug and the receptacle are formed in such a way that, when the setting tool engages in the tool head, a galvanic contact on the setting tool always lies against an identical associated galvanic contact on the interface of the tool head. This makes a defined assignment of the galvanic contacts for different functionalities possible.

In order to ensure more secure seating of the setting tool on the tool head, in the cutting tool setting system there are means for the nonpositive connection of the interface for the setting tool on the tool head and the tool-head engaging part of the setting tool. This means may take the form, for example, of a spring, a bayonet closure or a hook-and-loop closure. By providing a magnet on the tool-head engaging part of the setting tool and arranging magnetizable material in the region of the interface for the setting tool in the tool head, a particularly secure seating of the setting tool on the tool head can be achieved. As an alternative to this, it may be envisaged to arrange magnetizable material on the tool head engaging part of the setting tool and to provide a magnet in the region of the interface in the tool head. The tool head can then be exactly adjusted by the setting tool, without a loose electrical contact occurring at the interface of the tool head. The magnet is preferably configured as a ring magnet, which has a magnetic polarity oriented perpendicular to the ring surface. In this case, the axis of the ring magnet is oriented parallel to the longitudinal axis of the shank body when the setting tool is placed against the interface of the tool head. Consequently, the magnetic force helps to obtain correct seating of the setting tool on the tool head.

The invention is based on the realization that, at high rotational speeds, enormous centrifugal forces occur in a tool head that is connected to the machine spindle of a machine tool. This has the consequence that electrical subassemblies in such a tool are exposed to high mechanical loads. It is found that digital displays, for example in the form of LCD displays, i.e. liquid-crystal displays, do not withstand these centrifugal forces in continuous operation.

The invention is also based on the realization that the unfavorable conditions in terms of space and lighting with which an operator is faced when setting a tool head in a machine tool can be successfully counteracted by allowing the display device in a cutting tool setting system to be arranged flexibly, independently of the position of the tool head in the machine tool and independently of the position of the setting tool. This is so because a display on the display device can then be received in a reliable and ergonomically favorable manner by an operator even when on a machine tool.

A further realization of the invention is that a high level of productivity can also be achieved with a cutting tool setting system in which, though a fine adjustment of cutting inserts is only possible when the tool is stationary, a corresponding tool head with cutting inserts can be reliably operated at very high rotational speeds, in particular in the speed range of over 15 000 rpm.

The invention therefore envisages not to integrate a display device for displaying the adjustment of the tool head in the tool head itself but to arrange it separately. In this case, measurement information is transmitted from the electrical measuring device in the tool head wirelessly to the display device via the setting tool. The tool head can consequently be designed to be very small. This measure particularly brings about a reduction in the moment of inertia of the tool head.

A handle or an automatable drive, for example an electric motor, is provided for the actuation of the key part on the setting tool. The setting tool includes an electrical power source, which may take the form, for example, of a battery or a power capacitor. An LED with a position measuring device, i.e. a measuring device with a position-sensitive light sensor, or an LED with a CCD measuring device, i.e. a measuring device with a light-sensitive line or image sensor with charge displacement, is provided as the electrical measuring device in the tool head. These measuring devices have a small dead weight and are very small. They are therefore extremely suitable for integration in a tool head that rotates at high speed. The transmission unit in the setting tool and the transmission unit in the display unit are designed for radio transmission technology, i.e. for Bluetooth transmission technology. Bluetooth transmission technology is a technology for devices to be linked by radio transmission over short distances in accordance with the industry standard IEEE 802.15.1. Bluetooth transmission technology operates with microwaves in the frequency range between 2.402 GHz and 2.480 GHz, but the frequency band is divided into different frequency stages that are alternated up to 1600 times per second. Bluetooth transmission technology permits a data transmission rate of up to 706.25 kbit/s. In this way, reliable data transmission is made possible between the setting tool and the tool head for the display device, without a line-of-sight link between the subassemblies being required.

BRIEF DESCRIPTION OF THE DRAWINGS

An advantageous exemplary embodiment of the invention is described below and schematically represented in the drawings, in which.

DETAILED DESCRIPTION OF THE INVENTION

Figure 1:
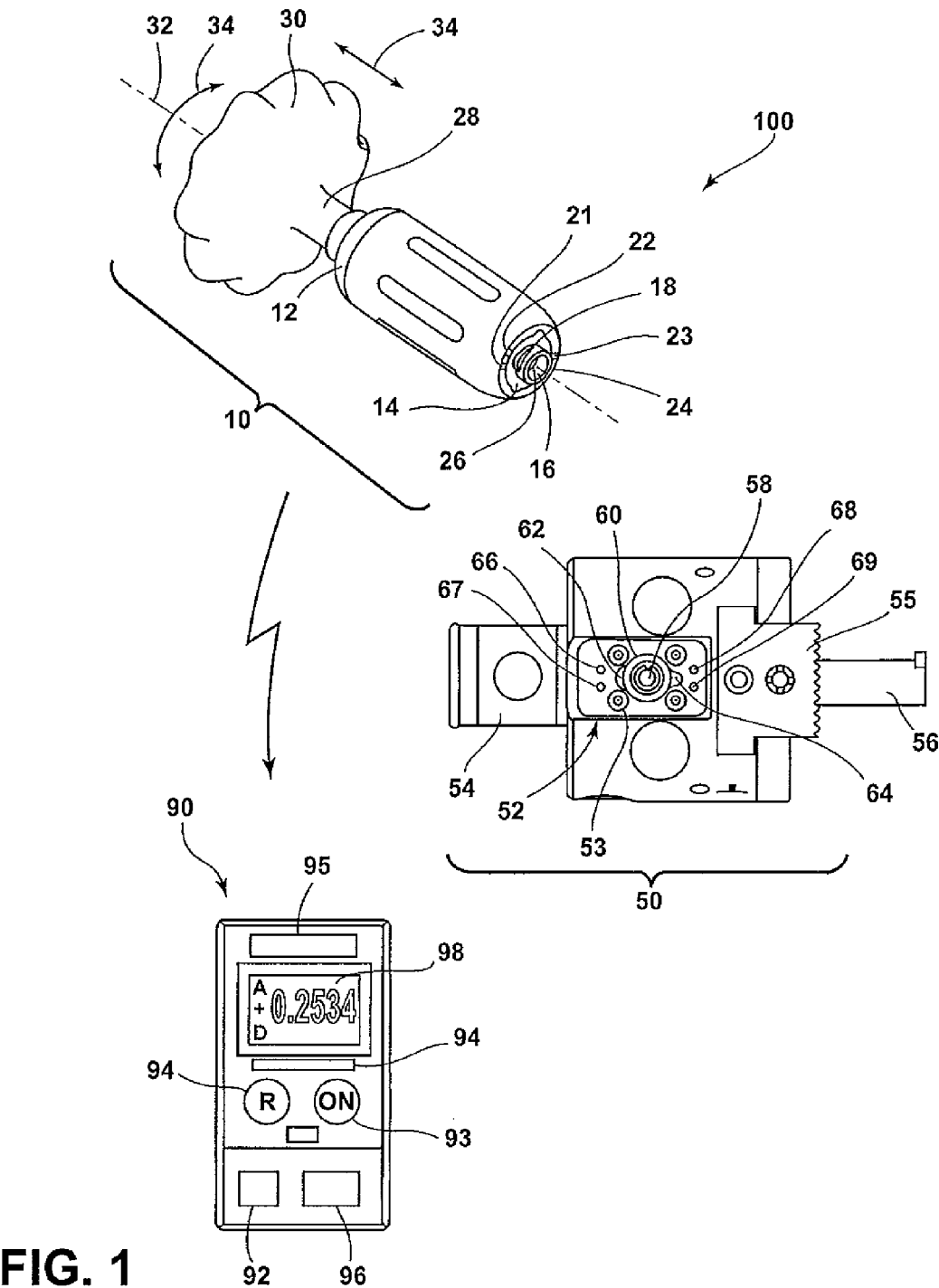
FIG. 1 shows a cutting tool setting system with a setting tool, a tool head and a display device.

The cutting tool setting system 100 in FIG. 1 comprises a setting tool 10, a tool head 50 and a display device 90.

The setting tool 10 has a shank body 12, on which a tool-head engaging part 14 is formed. This tool-head engaging part 14 is designed for engagement in an interface 52 on the tool head 50. On the tool-head engaging part 14 there is a coupling device 16. The coupling device comprises two differently shaped coupling lugs 18 and 20, which lie opposite each other. Formed on the tool-head engaging part 14 as an electrical connection element is a connection unit with four electrical contacts 21, 22, 23 and 24.

The setting tool 10 has a key part 26, which is located on the end face of a shaft part. By using a handle 30, the shaft part with the key part 26 can be turned about the axis 32 and displaced in the direction of the axis 32 in accordance with the double-headed arrow 34 between an engaging position for the key part 26 and a disengaged position of the key part 26.

By turning the handle 30 in the engaging position of the key part 26 in accordance with the double-headed arrow 35, a setting of the tool head 50 is brought about when the setting tool 10 is lying against the interface 52 of the tool 50.

On the tool head 50, the interface 52 is formed on a cover element 53, which consists of magnetizable material. The tool head 50 has a coupling portion 54 for the connection of the tool head 50 to the machine spindle of a machine tool (not represented any further). The tool head 50 includes an adjustment device with a settable slide 55. On the settable slide 55 there is a holding device for a cutting tool 56.

The interface 52 on the tool head 50 comprises a key engaging means 58 for the key part 26 of the setting tool 10. The interface 52 of the tool head 50 also has a coupling device 60 with receptacles 62, 64 for the coupling lugs 18 and 20 on the setting tool 10. The coupling device 60 with the receptacles 62, 64 is designed for interacting with the coupling device 16 on the setting tool 10. On the interface 52 of the tool head 50 there are electrical contacts 66, 67, 68, 69. The geometry of these electrical contacts 66, 67, 68, 69 on the tool head 50 is made to match the geometry of the electrical contacts 21, 22, 23 and 24 on the setting tool 10. The coupling lugs 18, 20 of the coupling device 16 on the setting tool 10 and the receptacles 62, 64 on the coupling device 60 ensure that the setting tool 10 can only be placed against the interface 52 of the tool head 50 in a specific orientation: in this single possible orientation, only the electrical contact 21 on the setting tool 10 can ever be connected to the electrical contact 66 on the interface 52 of the tool head 50, the contact 22 of the setting tool 10 to the contact 67 of the tool head 50, the contact 23 to the contact 69 and the contact 24 to the contact 68.

When the setting tool 10 is placed against the interface 52 of the tool head 50 in the orientation predetermined by the coupling devices 16, 60, a galvanic connection of the electrical contacts 66 to 69 on the tool head 50 to the corresponding electrical contacts 21, 22, 23 and 24 on the setting tool is obtained. This initiates the activation of the measuring device in the tool head: electrical measurement signals are then read from the measuring device in the tool head 50 via a conductor connection and the contacts into the setting tool 10.

The setting tool 10 has a radio transmission unit. The display device 90 includes a radio transmission unit 92. By means of this radio transmission unit, the setting tool 10 transmits measurement information from a measuring device in the tool head 50 to the display device 90.

The display device 90 comprises operator buttons 91 and 93, with which the display device 90 can be controlled. The display information received from the setting tool 10 is displayed at the display device 90 on an LCD display 98. The operator buttons make it possible in particular to switch the display 98 over between S/I measuring units and the measuring unit "inch".

The display device 90 has a battery 96 as an electrical power supply. As an alternative to this, a power capacitor, for example a so-called Gold Cap, may also be provided in the display device 90 as the electrical power supply. The display device 90 includes control electronics 94. The control electronics 94 have the effect that the LCD display 98 switches off automatically if the setting of the slide 55 on the tool head 50 has not been changed over a defined time period, for example for 30 s, or if the setting tool 10 is no longer transmitting measurement information to the display device 90 by means of radio transmission technology.

The display device 90 includes a permanent magnet 95. The permanent magnet 95 acts as a latching-holding device. It makes it possible to position the display device 90 on a magnetizable metal body, for example on a machine tool, in a position that is ergonomically favorable for an operator.

Figure 2A:
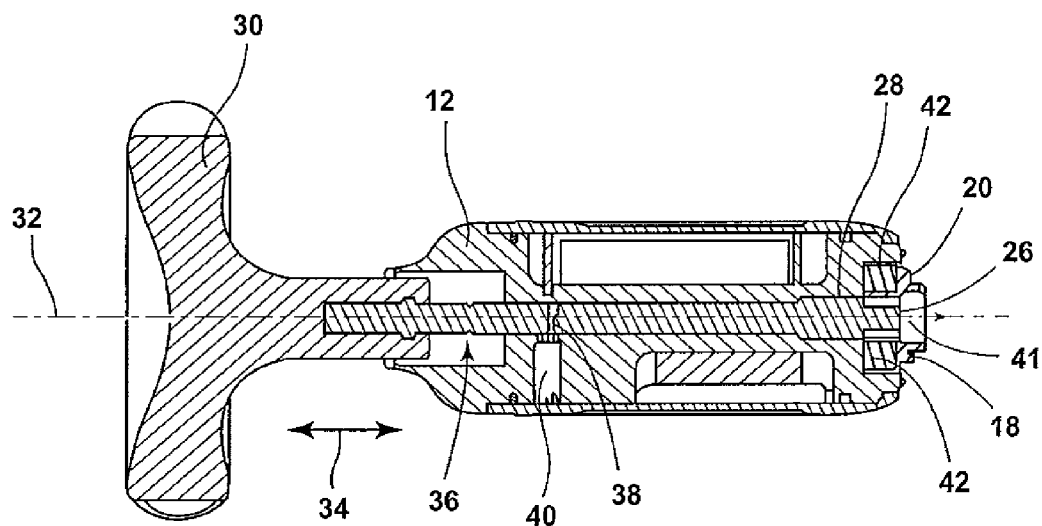
FIGS. 2a and b show a longitudinal section of the setting tool in the cutting tool setting system with the key part retracted and extended.

FIG. 2*a* shows a longitudinal section of the setting tool 10, wherein the key portion 26 on the shaft part 28 is retracted into the shank body 12. The shaft part 28 is rotatably mounted in the shank body. In the region of the shaft part 28 that is facing the handle 30, a first peripheral groove 36 and a second peripheral groove 38 are formed. The grooves 36, 38 are designed for interacting with a latching element in the form of a ball thrust screw 40 on the shank body 12. When the shaft part 28 moves along the axis 32 in accordance with the double-headed arrow 34, latching of the shaft portion 28 is brought about, both in a retracted position on the shank body 12 and in an engaging position for the key part 26 on the end face 28.

On the tool-head engaging portion 14 of the shank body 12 there is an annular permanent magnet 42. The annular permanent magnet 42 has magnetic polarity oriented in accordance with the axis 41, perpendicular to the ring surface. The magnetic polarity of the annular permanent magnet 42 is in line with the longitudinal axis 32 of the shank body 12.

The permanent magnet serves the purpose of magnetizing the cover-shaped covering element 53 on the tool head 50 when the setting tool 10 is connected to the interface 52: the shank body 12 of the setting tool 10 and the covering element 53 on the tool head 50 then draw each other together. In this way, reliable, play-free abutment of the tool-head engaging portion 14 on the shank body 12 of the setting tool against the interface 52 on the tool head 50 is ensured when the setting tool 10 is connected to the tool head 50.

Figure 2B:
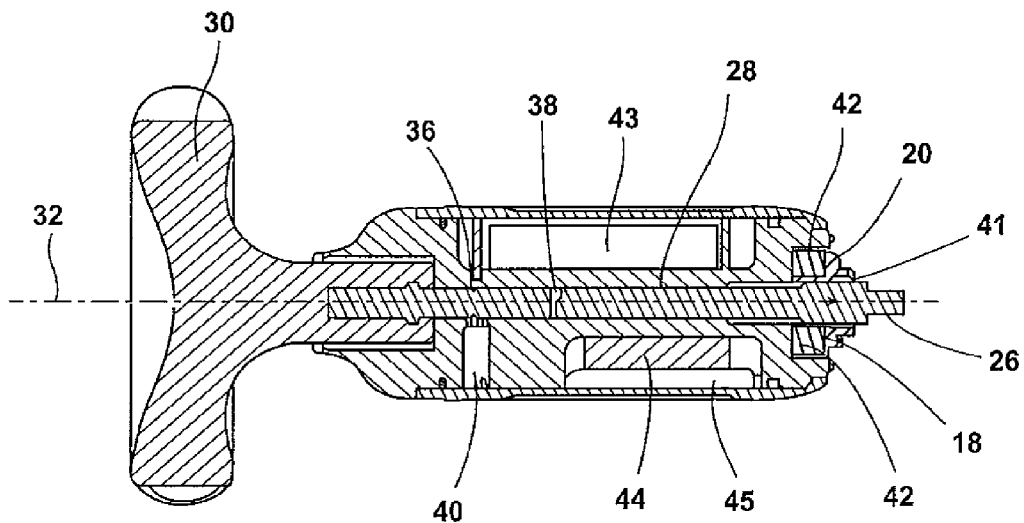

FIG. 2*b* shows a longitudinal section of the setting tool 10 for the extended position of the key part 26 with respect to the shank body 12. The shank body 12 includes an electrical energy store 43 with a number of batteries, which supply electrical power to an electronics unit 44 and a radio transmission unit 45. As an alternative to batteries, one or more power capacitors may also be provided as an energy store. The Bluetooth transmitting unit 45 is designed for a microwave output power in the range of 150-200 mW at a frequency of approximately 2 GHz. The concept of the wireless data transmission from the setting tool 10 to the display device 90 with simultaneous transmission of measurement information by means of electrical conductors and contacts from the tool head 50 into the setting tool 10 makes it possible that only very little electrical power has to be provided for the sensing of measurement information by the electrical measuring device in the tool head and the transmission of this measurement information: electrical power that lies in the range of mW, i.e. about 2 orders of magnitude less than the power required for data transmission by means of Bluetooth technology, is sufficient. It is therefore adequate to provide only small, low-power energy stores for data transmission and displacement measurement in the tool head 50.

As an alternative to this, the tool head 50 could also be configured without an integrated electrical energy store: then the measuring device in the tool head 50 must be supplied with electrical power from the setting tool. In any event, the transmission of measurement information by means of a data link from the tool head 50 into the setting tool 10 makes it possible that less installation space, or no installation space, has to be provided for electrical energy stores in the tool head 50. The overall volume for the tool head 50 can therefore be kept small.

When the setting tool 10 is connected to the interface 52 of the tool head 50, the electrical contacts 21 to 24 on the setting tool and the electrical contacts 66 to 69 on the interface 52 of the tool head come into engagement. The electronics unit 44 in the setting tool is then activated. This has the consequence that measurement information is read from the measuring device in the tool head 50 into the setting tool 10. The electronics unit 44 in the setting tool 10 passes the measurement data obtained from the tool head 50 to the radio transmission unit 45. The radio transmission unit 45 in the setting tool 10 then sends the measurement data to the display device 90. In principle, the electronics unit 44 could also be arranged in the tool head 50.

Figure 3A:
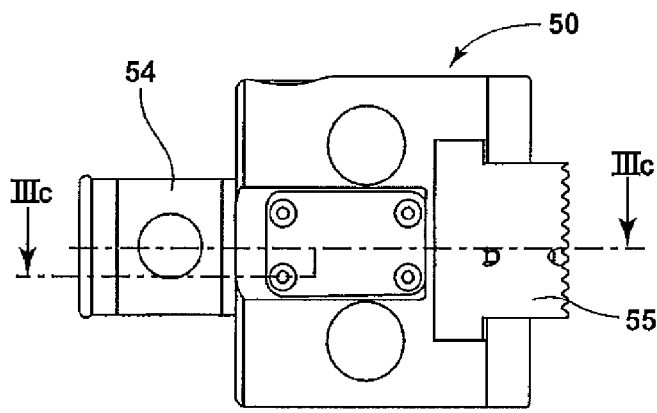
FIGS. 3a to c show various views of the tool head in the cutting tool setting system.

FIG. 3*a* shows the tool head 50 from FIG. 1 in a rear view. The slide 55 in the tool head 50 can be adjusted parallel to the planes defined by means of the line IIIc-IIIc.

Figure 3B:
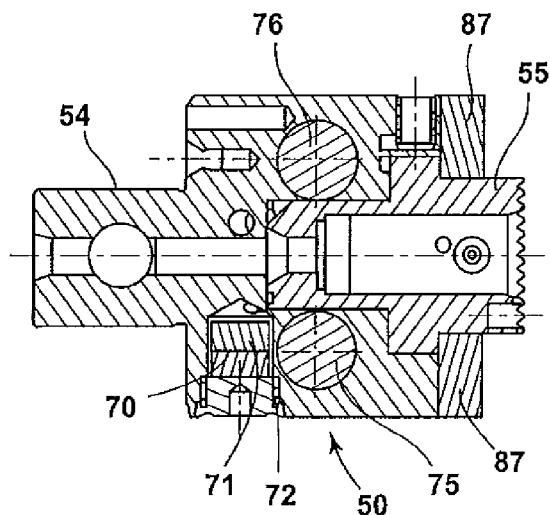

FIG. 3*b* shows a longitudinal section of the tool head 50. The tool head 50 has a main body 77. The slide 55 is guided on the main body 77 of the tool head 50 in a sliding bearing. It is held on the main body 77 by a cover 87. Formed in the tool head 50 is a receptacle 70 for two button cell batteries 71, 72, which are located in the main body 77 of the tool head. By means of the button cell battery 71, 72, the measuring device 82 in the tool head 50 is supplied with electrical power. As an alternative to button cell batteries 71, 72, other electrical energy sources of small dimensions, for example high-power capacitors in the form of so-called Gold or Super Caps, may also be provided for the tool head 50. In order to ensure uniform concentricity of the tool head even at high rotational speeds, two adjustable compensating weights 73 and 75 are provided on the main body of the tool head 50.

Figure 3C:
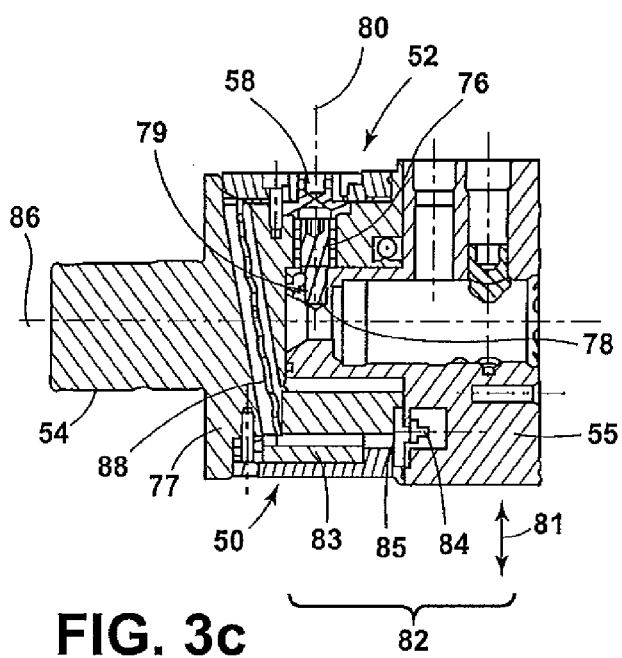

FIG. 3c shows a section of the tool head 50 along the line IIIc-IIIc from FIG. 3a. In this section, the interface 52 with the coupling device 60 and the key engaging means 58 can be seen. The key engaging means 58 is located on the end face of a drive element 76. The drive element 76 is rotatably mounted in the main body 77 of the tool head 50. The drive element 76 is in operative connection in a portion 78 with a thread 79, which is formed on the slide 55 of the tool head 50. By turning the drive element 76 about the axis 80, the slide 55 can consequently be displaced in accordance with the double-headed arrow 81.

The electronic measuring device 82 in the tool head is arranged in a portion in the tool head 50 that is opposite from the drive element 76. The measuring device 82 in the tool head 50 is a displacement measuring system. It comprises an LED 84, which is fixedly connected to the slide 55. The LED 84 is assigned a module 85 for position sensing in the main body 77 of the tool head 50. The tool head 50 includes evaluation electronics 83, which comprise a controller. The evaluation electronics 83 are connected via a flexible conductor 88 to the electrical contacts on the interface 52 of the tool head 50. Instead of the flexible conductor, conventional electrical line connections may also be provided. At the electrical contacts of the interface 52, the evaluation electronics 83 provide measurement data concerning the position of the slide 55 with respect to the axis 86 of the tool head 50. When the setting tool 10 is connected to the interface 52 in the tool head 50, these measurement data are transmitted through an electrical line via the contacts 66 to 69 on the tool head 50 and the contacts 21 to 24 on the setting tool. The evaluation electronics 83 in the tool head 50 make it possible to measure an adjustment of the slide 55 exactly. This arrangement of the measuring and evaluation electronics within the main body 77 in the tool head 50 particularly ensures reliable, play-free operation under the high mechanical loads for the measuring device that occur at very high tool head rotational speeds in the range of 15 000 rpm.

To sum up, the following can be stated: The invention relates to a cutting tool setting system 100 comprising a tool head 50 for the settable holding of a cutting tool 56. The tool head 50 has an adjustment device 55 for the cutting tool 56. The cutting tool setting system 100 comprises a setting tool 10, which can be made to engage with the tool head 50 in a mechanically detachable manner at an interface 52 for the adjustment of the adjustment device 55 in the tool head 50. The setting tool 10 has a shank body 12 with a key part 26. A key engaging means 58 for the actuation of the adjustment device 54 is formed on the tool head 50. The key part 26 can be displaced in relation to the shank body 12 in the direction of the longitudinal axis 32 of the latter, in order optionally to couple and release the key part 26 of the setting tool 10 and the key engaging means 58 on the interface 52 of the tool head 50.

The invention claimed is:

1. A cutting tool setting system comprising:
   a tool head for the settable holding of a cutting tool, the tool head comprising an adjustment device for adjusting the position of the cutting tool and an interface with a key engaging means through which the adjustment device is adjusted and
   a manually operable setting tool for engaging with the tool head at the tool head interface in a mechanically detachable manner for adjusting the adjustment device, the manually operable setting tool comprising a manually operable handle provided at an end thereof, a shank body and a key provided on an end face of a shaft which is rotatable with respect to the shank body,
   wherein manual operation of the handle causes the key to move relative to the shank body in a direction along the longitudinal axis of the setting tool to couple or release the key with or from the key engaging means.

2. The cutting tool setting system as claimed in claim 1, wherein the tool head includes an electrical measuring device for sensing the setting of the cutting tool, an electrical connection element is provided on the shank body of the setting tool and an electrical connection element is provided on the tool head, in order to transmit measurement information from the electrical measuring device.

3. The cutting tool setting system as claimed in claim 2, wherein the setting tool has a tool-head engaging part in which there is formed a mechanical coupling device which is separate from the electrical connection element and brings about a rotationally fixed coupling of the shank body and the tool head when the setting tool engages in the tool head.

4. The cutting tool setting system as claimed in claim 3, comprising means for connecting an interface for the setting tool on the tool head with the tool-head engaging part of the setting tool.

5. The cutting tool setting system as claimed in claim 4, wherein a magnet is arranged on the tool-head engaging part and magnetizable material is provided in the region of the interface in the tool head for connecting the interface and the tool-head engaging part, or magnetizable material is provided on the tool head engaging part of the setting tool and a magnet is arranged in the region of the interface in the tool head.

6. The cutting tool setting system as claimed in claim 5, wherein the magnet is a ring magnet which has a magnetic polarity oriented perpendicular to the ring surface and the axis of the ring magnet is oriented parallel to the longitudinal axis of the shank body when the setting tool is placed against the interface of the tool head.

7. The cutting tool setting system as claimed in claim 2, wherein the electrical connection element on the tool head and the electrical connection element on the shank body of the setting tool are designed for at least one group of a first group of optical, capacitive and inductive transmission of measurement information and a second group of transmission of measurement information by radio.

8. The cutting tool setting system as claimed in claim 2, wherein the electrical connection element on the tool head comprises one or more galvanic contacts and the electrical connection element on the setting tool has one or more galvanic contacts.

9. The cutting tool setting system as claimed in claim 8, wherein a coupling device on the setting tool is assigned to a coupling device on the tool head and at least one coupling lug and an associated receptacle for the at least one coupling lug are provided such that, when the setting tool engages in the tool head, a galvanic contact on the setting tool always lies against an identical associated galvanic contact on the interface of the tool head.

10. The cutting tool setting system as claimed in claim 1, wherein the setting tool includes a battery, a power capacitor or a storage battery as an electrical energy store.

11. The cutting tool setting system as claimed in claim 1, wherein an LED with a position measuring device is provided as the electrical measuring device.

12. The cutting tool setting system as claimed in claim 1, wherein a display device is provided for displaying measurement information transmitted into the setting tool, the setting tool has a transmission unit and the display device includes a transmission unit for transmitting measurement information from the setting tool wirelessly to the display device.

13. The cutting tool setting system as claimed in claim 12, wherein the transmission unit in the setting tool and the transmission unit in the display unit are designed for the transmission of information by radio.

14. The cutting tool setting system as claimed in claim 12, wherein the display device comprises a latching-holding device.

15. The cutting tool setting system as claimed in claim 1, wherein a latching device is provided for the shaft part and latches the shaft in at least one of a first position for the engagement of the key part in the key engaging means on the interface of the tool head and a second position in which the key part is retracted into the shank body.

16. A setting tool for a cutting tool setting system, comprising a shank body and a key part which is rotatable in relation to the shank body, wherein the key part can be moved relative to the shank body in the direction of the longitudinal axis of the shank body to couple or release the key part and a key engaging means on an interface of a tool head.

17. The setting tool as claimed in claim 16, wherein the shank body has a tool-head engaging part in which there is formed a mechanical coupling device which is separate from an electrical connection element and brings about a rotationally fixed coupling of the shank body and the tool head when the setting tool engages with the tool head.

18. The setting tool as claimed in claim 17, characterized in that there is a magnet on the tool-head engaging part.

19. The setting tool as claimed in claim 18, wherein the magnet is a ring magnet which has a magnetic polarity oriented perpendicular to the ring surface and the axis of the ring magnet is oriented parallel to the longitudinal axis on the shank body when the setting tool is placed against the interface of the tool head.

20. The setting tool as claimed in claim 17, wherein there is magnetizable material on the tool-head engaging part.

\* \* \* \* \*